(12) United States Patent
Kanamaru (10) Patent No.: US 7,195,515 B2
(45) Date of Patent: Mar. 27, 2007

(54) WIRE HARNESS LEADING-OUT STRUCTURE

(75) Inventor: Masahiro Kanamaru, Ogasa-gun (JP)

(73) Assignee: Yazaki Corporation, Tokyo (JP)

(*) Notice: Subject to any disclaimer, the term of this patent is extended or adjusted under 35 U.S.C. 154(b) by 54 days.

(21) Appl. No.: 11/250,483

(22) Filed: Oct. 17, 2005

(65) Prior Publication Data

US 2006/0089021 A1 Apr. 27, 2006

(30) Foreign Application Priority Data

Oct. 25, 2004 (JP) ............................ P2004-310112

(51) Int. Cl.
*H01R 13/58* (2006.01)
(52) U.S. Cl. ........................... 439/465; 439/942
(58) Field of Classification Search .............. 439/76.1, 439/76.2, 465, 519, 521, 535, 942; 174/650
See application file for complete search history.

(56) References Cited

U.S. PATENT DOCUMENTS

| | | | | |
|---|---|---|---|---|
| 6,430,036 B1 * | 8/2002 | Cornell et al. | ............... | 361/648 |
| 6,498,295 B1 * | 12/2002 | Akiyama et al. | ............ | 174/650 |
| 6,561,822 B2 * | 5/2003 | Depp et al. | ................. | 439/76.2 |
| 6,730,849 B2 * | 5/2004 | Koessler | ....................... | 174/93 |
| 6,837,745 B2 * | 1/2005 | Takada et al. | ............... | 439/595 |
| 6,897,380 B2 * | 5/2005 | Sakata et al. | ................ | 174/650 |

FOREIGN PATENT DOCUMENTS

JP    2000-166058 A    6/2000

* cited by examiner

*Primary Examiner*—Khiem Nguyen
(74) *Attorney, Agent, or Firm*—Sughrue Mion, PLLC (57) ABSTRACT

In a wire harness leading-out structure in which a harness notch groove is formed in a case body, and a water stop cover is slidingly inserted into the harness notch groove, and a wire harness outlet port for the passage of a wire harness therethrough is formed by that portion of the harness notch groove which is not closed by the water stop cover, a plurality of the harness outlet ports are formed by that portion of the harness notch groove which is not closed by the water stop cover, and the plurality of harness outlet ports are arranged at two different heights, respectively.

12 Claims, 7 Drawing Sheets

WIRE HARNESS LEADING-OUT STRUCTURE

BACKGROUND OF THE INVENTION

1. Field of the Invention

This invention relates to a wire harness leading-out structure for leading a plurality of wire harnesses out of a case.

2. Related Art

Figure 7:
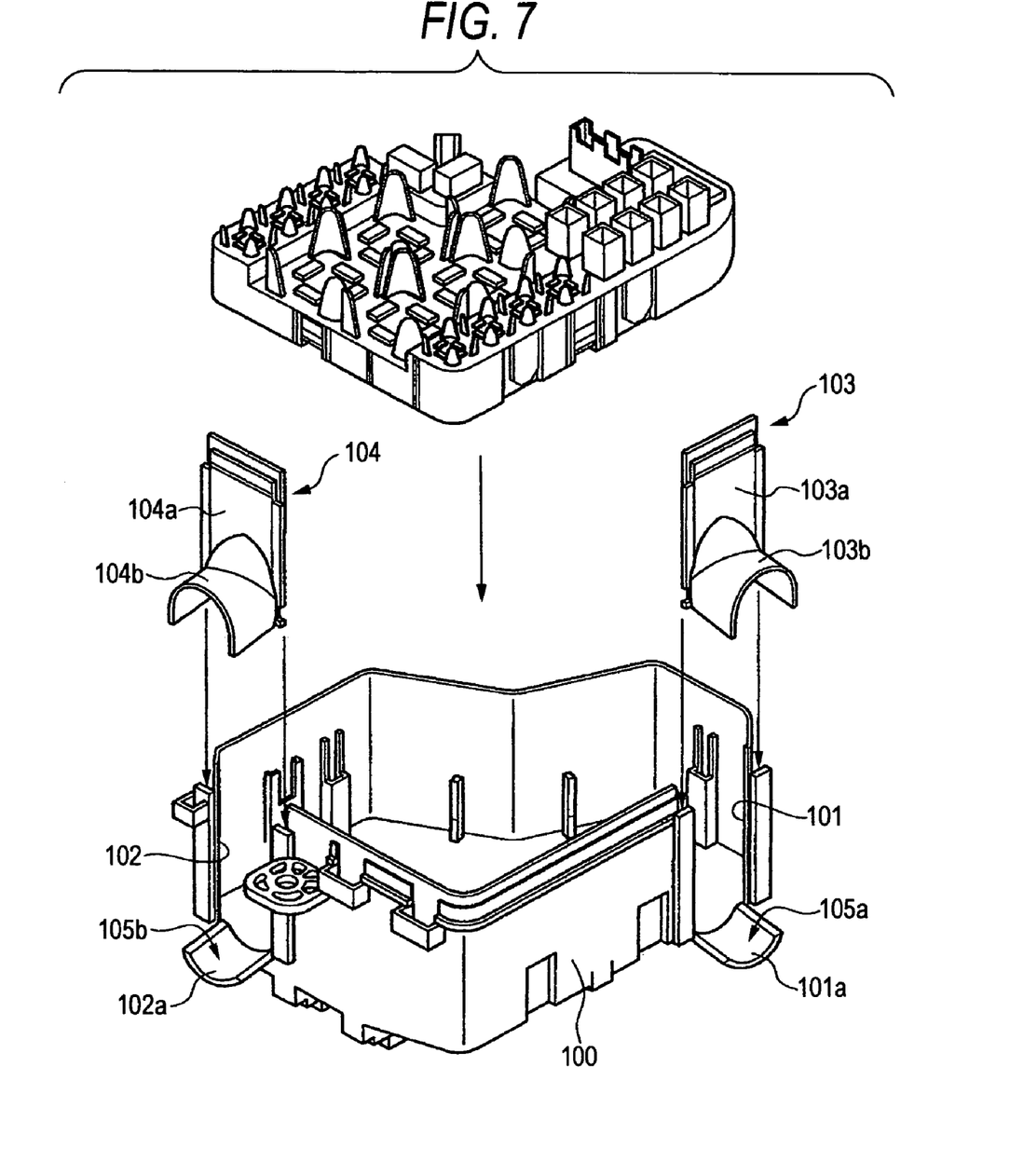
FIG. 7 is an exploded perspective view showing a conventional wire harness leading-out structure.

Waterproof means is provided, for example, at an electric connection box mounted in a place (as within an engine room) into which water can intrude. As one of such waterproof measures, a wire harness leading-out structure of the electric connection box also need to be formed into a waterproof construction. FIG. 7 shows one conventional structure of this kind disclosed in JP-A-2000-166058.

As shown in FIG. 7, this wire harness leading-out structure includes two harness notch grooves 101 and 102 formed in a case 100, and these harness notch grooves 101 and 102 are open to an upper edge of the case 100. A lower end surface of each of the harness notch grooves 101 and 102 is formed into a semi-circular shape, and a lower harness protective wall 101a, 102a of a semi-cylindrical shape is formed on and projects from the case 100 in continuous relation to the semi-circular surface. Water stop covers 103 and 104 are slidably mounted in the harness notch grooves 101 and 102, respectively.

Each of the water stop covers 103 and 104 includes a plate portion 103a, 104a for closing the harness notch groove 101, 102 except a harness receiving space thereof (in which a wire harness (not shown) is inserted), and an upper harness protective wall 103b, 104b of a semi-cylindrical shape formed integrally on and projecting from a lower end of the plate portion 103a, 104a. Namely, when each of the two water stop covers 103 and 104 is slidingly inserted into the harness notch groove 101, 102 until the upper harness protective wall 103b, 104b is brought into abutting engagement with the lower harness protective wall 101a, 102a of the case 100, a harness outlet port 105a, 105b of a circular shape is formed.

In the above construction, each of the wire harnesses (not shown) is inserted into the corresponding harness notch groove 101, 102, and then the lower end of each of the water stop covers 103 and 104 is brought into registry with the upper end of the harness notch groove 101, 102, and then is slid downward. Each water stop cover 103, 104 is slidingly inserted into the harness notch groove 101, 102 until the upper harness protective wall 103b, 104b is brought into abutting engagement with the lower harness protective wall 101a, 102a. As a result, the harness outlet port 105a, 105b is formed by the area of the harness notch groove 101, 102, which is not closed by the water stop cover 103, 104, and the area surrounded by the upper harness protective wall 103b, 104b and the lower harness protective wall 101a, 102a. The wire harnesses (not shown) are disposed in the harness outlet ports 105a and 105b, respectively.

With this waterproof structure, water can not easily intrude into the case 100 through the harness outlet ports 105a and 105b.

In the above conventional wire harness leading-out structure, however, the number of each of the harness outlet ports 105a and 105b, formed by the water stop cover 103, 104 and the harness notch groove 101, 102, is one. Therefore, when it is desired to provide such a structure that a plurality of wire harnesses (not shown) are led out of the case 100, a plurality of harness outlet ports 105a (each formed by the harness notch groove 101 and the water stop cover 103) and a plurality of harness outlet ports 105b (each formed by the harness notch groove 102 and the water stop cover 104) need to be formed in the case 100, and therefore a large space must be secured.

It may be proposed to form a plurality of harness outlet ports 105a, 105b by the harness notch groove 101, 102 and the water stop cover 103, 104. However, when the adjacent harness outlet ports 105a, 105b are arranged consecutively with no gap formed therebetween, lateral displacement of the wire harnesses (not shown) can be prevented until the water stop cover 103, 104 is completely slidingly inserted.

SUMMARY OF THE INVENTION

Therefore, this invention has been made in order to solve the above problems, and an object of the invention is to provide a wire harness leading-out structure in which a plurality of harness outlet ports can be formed in a space-saving manner, and besides lateral displacement of wire harnesses can be prevented as much as possible.

(1) According to the invention, there is provided

A wire a harness leading-out structure comprising:

a case in which a notch groove is formed; and a water stop cover slidably mounted to the notch groove, wherein a plurality of harness outlet ports are formed in a part of the notch groove which is not covered with the water stop cover, and adjacent harness outlet ports have different heights to each other so as to form a step portion therebetween.

(2) The adjacent harness outlet ports ma y be arranged so as to form a height gap larger than a diameter of a wire harness to be lead out.

(3) The plurality of harness outlet ports may be so arranged that heights vary sequentially.

(4) The plurality of harness outlet ports may be arranged at two different heights.

(5) Each of the plurality of harness outlet ports may be provided with an upper harness protective wall of a semi-cylindrical shape projecting from a part of the water stop cover.

(6) Each of the plurality of harness outlet ports may be provided with a lower harness protective wall of a semi-cylindrical shape projecting from a part of the case.

(7) According to the invention, there is provided an electric connection box mounted in a vehicle, comprising:

a case in which a notch groove is formed; and a water stop cover slidably mounted to the notch groove, wherein a plurality of harness outlet ports are formed in a part of the notch groove which is not covered with the water stop cover, and adjacent harness outlet ports have different heights to each other so as to form a step portion therebetween.

In the invention, even when the adjacent harness outlet ports are arranged consecutively with no gap formed therebetween, lateral movement of the wire harnesses can be prevented at an early stage of the process of sliding insertion of the water stop cover, and therefore the lateral displacement of the wire harnesses can be prevented as much as possible. Therefore, the plurality of harness outlet ports can be formed in a space-saving manner, and besides the lateral displacement of the wire harnesses can be prevented as much as possible. Furthermore, by slidingly inserting the single water stop cover into the harness notch groove, the plurality of harness outlet ports can be formed, and by withdrawing the single water stop cover from the harness notch groove, the plurality of harness outlet ports can be opened at a time.

In the invention, even when the water stop cover is not yet mounted in the harness notch groove, the lower-side wire harness is prevented by a step-forming surface (having a height larger than the height of this wire harness) from being moved toward the upper-side wire harness. Thus, the lateral displacement of the wire harness can be prevented in a stable manner.

In the invention, when there are provided more than two harness outlet ports, the lower one of any two adjacent wire harnesses is prevented by the step-forming surface from being moved toward the higher one. Therefore, by bringing each lower wire harness in this direction, all of the wire harnesses can be easily provisionally fixed.

In the invention, when there are provided more than two harness outlet ports, a space of installation of the harness outlet ports in the direction of the height can be made small.

DETAILED DESCRIPTION OF THE PREFERRED EMBODIMENTS

A preferred embodiment of the present invention will now be described with reference to the drawings.

Figure 1:
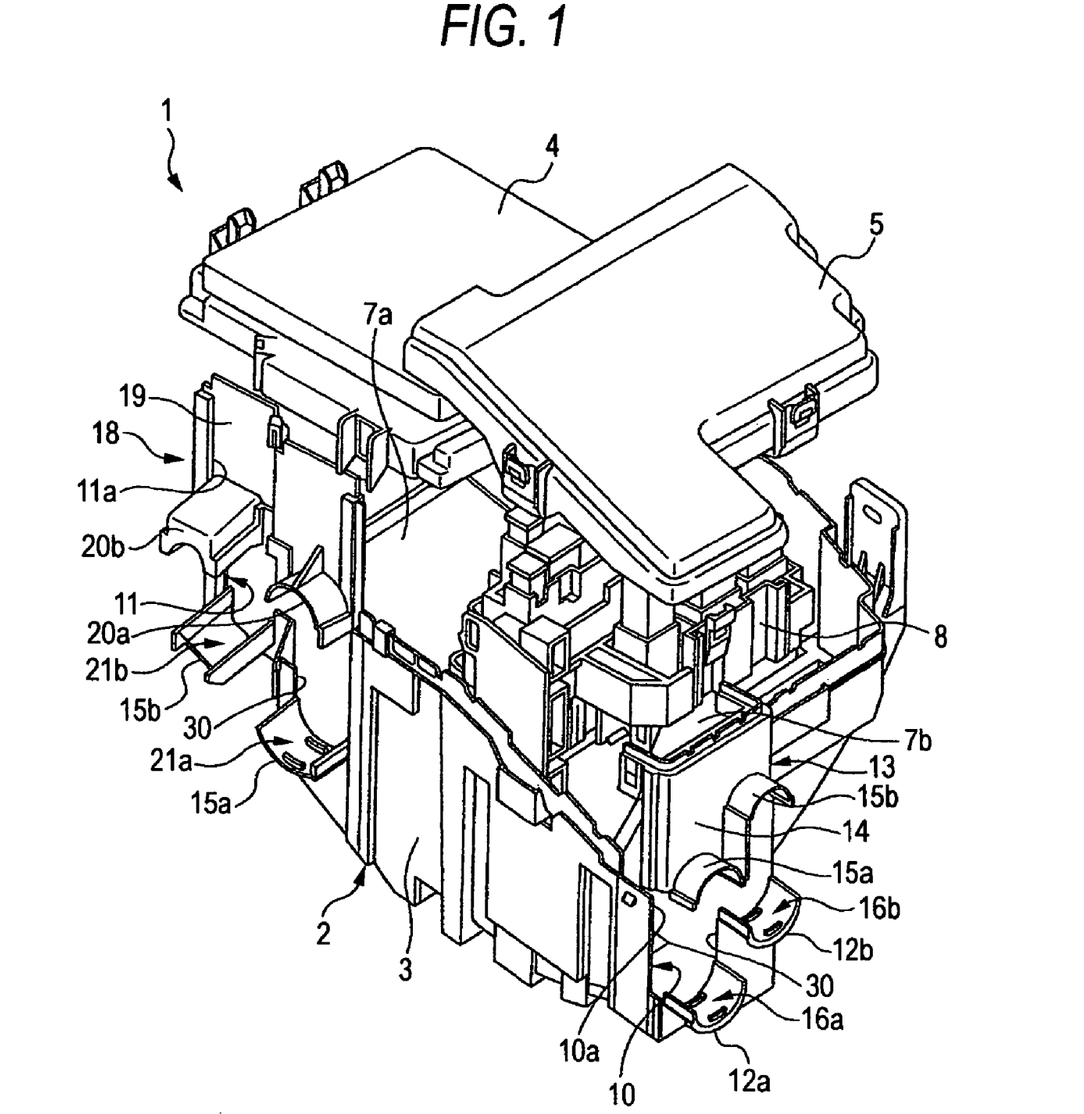
FIG. 1 is an exploded perspective view of an electric connection box, showing a first embodiment of the present invention.
Figure 2:
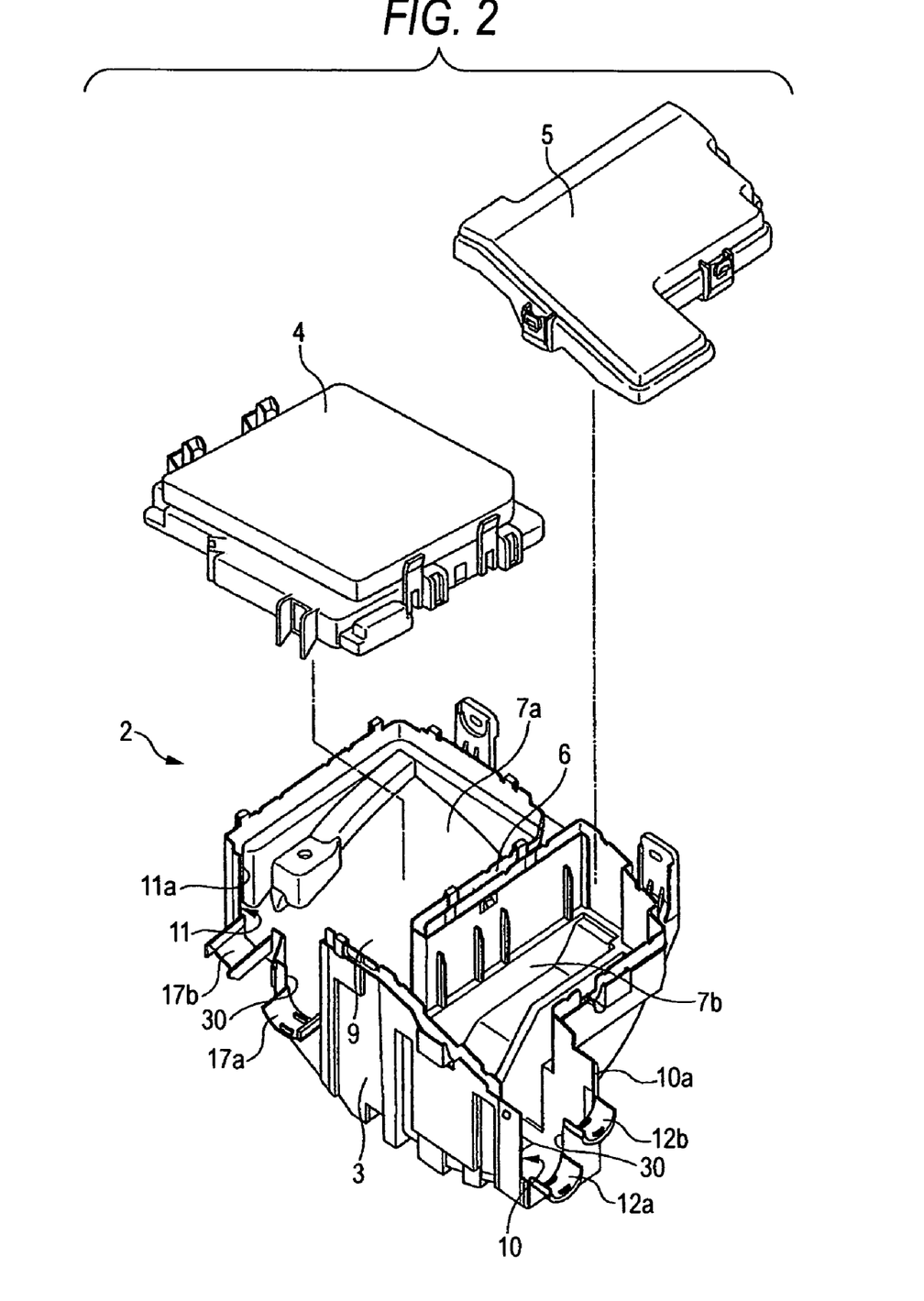
FIG. 2 is an exploded perspective view of a case, showing the first embodiment of the invention.
Figure 3:
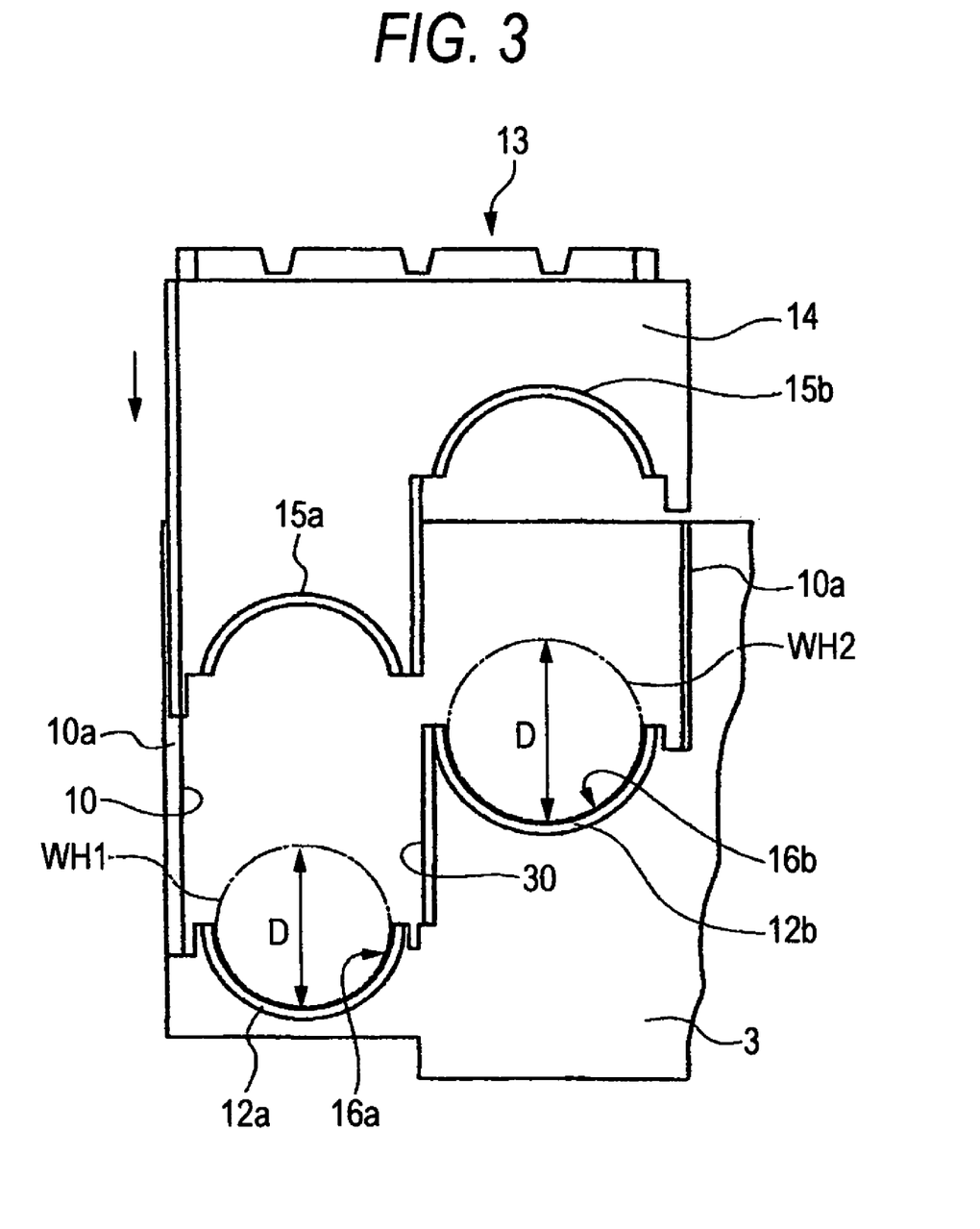
FIG. 3 is a front-elevational view showing the process of mounting a water stop cover, showing the first embodiment of the invention.
Figure 4:
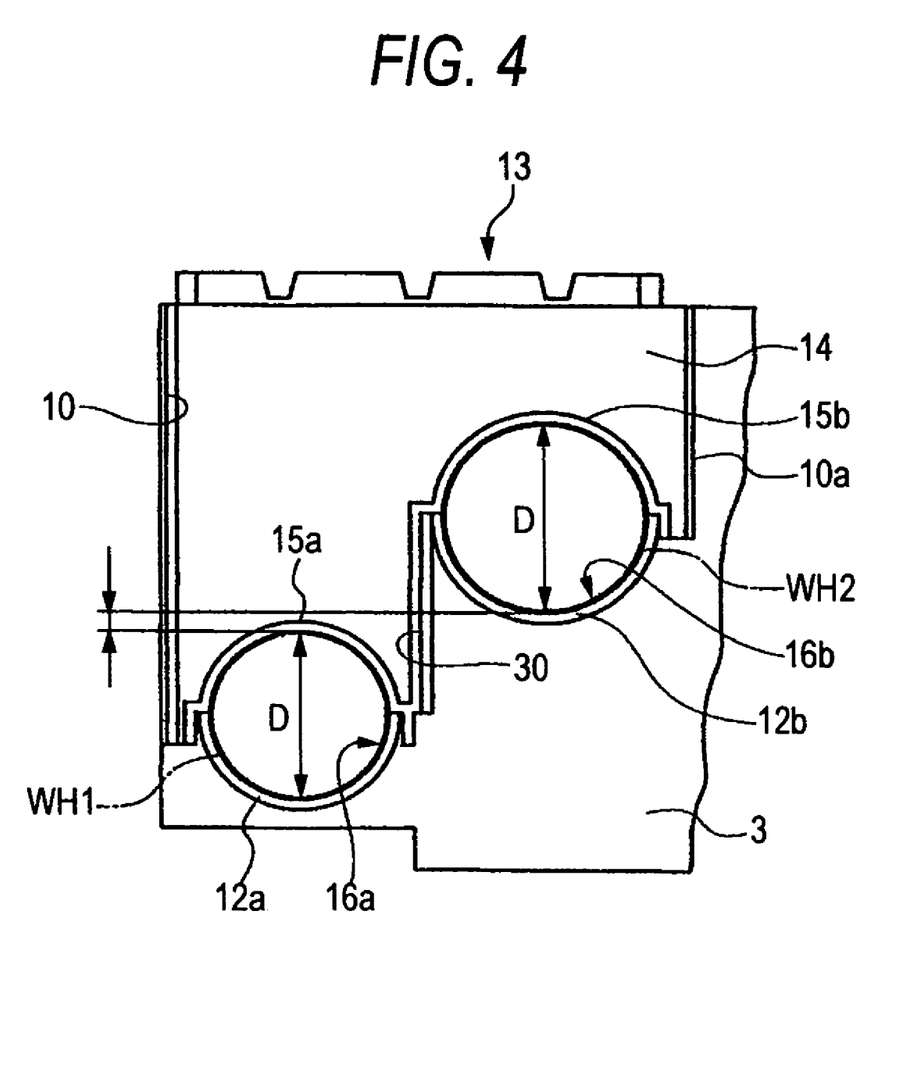
FIG. 4 is a front-elevational view showing a condition in which the water stop cover is completely mounted, showing the first embodiment of the invention.

FIGS. 1 to 4 show the first embodiment of a wire harness leading-out structure of the invention applied to an electric connection box, FIG. 1 is an exploded perspective view of the electric connection box, FIG. 2 is an exploded perspective view of a case, FIG. 3 is a front-elevational view showing the process of mounting a water stop cover, and FIG. 4 is a front-elevational view showing a condition in which the water stop cover is completely mounted.

As shown in FIGS. 1 and 2, the electric connection box 1 comprises the case 2 which is formed into a water-tight structure so as to prevent water from intruding into the case 2. The case 2 includes a case body 3 with an open top, and a first cover 4 and a second cover 5 which are attached to the case body 3 to close the open top of this case body 3.

The interior of the case body 3 is broadly divided or partitioned into two part-receiving chambers 7a and 7b by a partition wall 6. Relay blocks 8 or the like are received in the two part-receiving chambers 7a and 7b, respectively. The two part-receiving chambers 7a and 7b communicate with each other via a communication passageway 9. Utilizing this communication passageway 9, a second wire harness WH2 is installed over a region including the two part-receiving chambers 7a and 7b.

Two harness notch grooves 10 and 11 (which are open upwardly) are formed in a side wall of the case body 3. A lower end surface of the harness notch groove 10 is formed by two semi-circular surfaces which are different in height so that a step is formed therebetween. Two lower harness protective walls 12a and 12b of a semi-cylindrical shape are formed on and project from the case body 3 in continuous relation respectively to these semi-circular surfaces. The water stop cover 13 is mounted in the harness notch groove 10 so as to slide along left and right side surfaces 10a (serving as sliding surfaces) of this harness notch groove 10.

The water stop cover 13 includes a plate portion 14 for closing the harness notch groove 10 except two harness receiving spaces thereof, and two upper harness protective walls 15a and 15b of a semi-cylindrical shape formed integrally on and projecting from a lower end of the plate portion 14. Namely, when the water stop cover 13 is slidingly inserted into the harness notch groove 10 until the two upper harness protective walls 15a and 15b are brought into abutting engagement with the two lower harness protective walls 12a and 12b of the harness stop groove 10, respectively, two harness outlet ports 16a and 16b of a circular shape are formed by the area of the harness notch groove 10, which is not closed by the water stop cover 13, an area surrounded by the upper harness protective wall 15a and the lower harness protective wall 12a and an area surrounded by the upper harness protective wall 15b and the lower harness protective wall 12b. The two harness outlet ports 16a and 16b are disposed respectively at positions which are different in height, and are shifted relative to each other by an amount larger than a diameter D of wire harnesses WH1 and WH2 which are to be installed respectively in these ports 16a and 16b. Cross-sectional areas of the harness outlet ports 16a and 16b are substantially equal respectively to cross-sectional areas of the wire harnesses WH1 and WH2 which are to be installed respectively in these ports 16a and 16b.

A lower end surface of the other harness notch groove 11 is formed by two semi-circular surfaces which are different in height so that a step is formed therebetween. Two lower harness protective walls 17a and 17b of a semi-cylindrical shape are formed on and project from the case body 3 in continuous relation respectively to these semi-circular surfaces. A water stop cover 18 is mounted in the harness notch groove 11 so as to slide along left and right side surfaces 11a (serving as sliding surfaces) of this harness notch groove 11. The water stop cover 18 includes a plate portion 19 for closing the harness notch groove 11 except two harness receiving spaces thereof, and two upper harness protective walls 20a and 20b of a semi-cylindrical shape formed integrally on and projecting from a lower end of the plate portion 19. When the upper harness protective walls 20a and 20b are brought into abutting engagement with the lower harness protective walls 17a and 17b, respectively, two harness outlet ports 21a and 21b of a circular shape are formed.

In the above construction, the two wire harnesses WH1 and WH2 are inserted into the slide notch groove 10 in the case body 3, and are placed on the lower harness protective walls 12a and 12b, respectively. Then, the lower end of the water stop cover 3 is brought into registry with the upper end of the harness notch groove 10 as shown in FIG. 3, and then is slid downward. As a result, the water stop cover 13 is slid along the sliding surfaces 10a, and is inserted into the harness notch groove 10. When the water stop cover 13 is moved downward into a position (slightly lower than a position shown in FIG. 3) where the lower-side upper harness protective wall 15a (left-side one in FIG. 3) interferes with the upper-side lower harness protective wall 12a (right-side one in FIG. 3), the two wire harnesses WH1 and WH2 are prevented from lateral displacement. Then, the water stop cover 13 is further slidingly inserted from this position until the upper harness protective walls 15a and 15b, opposed respectively to the lower harness protective walls 12a and 12b, are brought into abutting engagement with these lower harness protective walls 12a and 12b, respectively, as shown in FIG. 4. As a result, the two harness outlet ports 16a and 16b are formed by the area of the harness notch groove 10, which is not closed by the water stop cover 13, the area surrounded by the upper harness protective wall 15a and the lower harness protective wall 12a and the area surrounded by the upper harness protective wall 15b and the lower harness protective wall 12b. The wire harnesses WH1 and WH2 are disposed in the harness outlet ports 16a and 16b, respectively. The outer peripheries of the wire harnesses WH1 and WH1 are held in substantially intimate contact with the inner surfaces of the harness outlet ports 16a and 16b, respectively, and therefore water will not intrude into the case 2 through a gap between each of the harness outlet ports 16a and 16b and the corresponding wire harness WH1, WH2.

Similarly, two wire harnesses are installed in the other harness notch groove 11.

As described above, the two harness outlet ports 16a and 16b are formed by the water stop cover 13 and the harness notch groove 10, and the two harness outlet ports 16a and 16b are disposed at the different levels (heights), respectively. Therefore, the lateral movement of the wire harnesses WH1 and WH2 can be prevented at an early stage of the process of sliding insertion of the water stop cover 13, and therefore the lateral displacement of the wire harnesses WH1 and WH2 can be prevented as much as possible. Therefore, the two harness outlet ports 16a and 16b can be formed in a space-saving manner, and besides the lateral displacement of the wire harnesses WH1 and WH2 can be prevented as much as possible. Furthermore, by slidingly inserting the single water stop cover 13 into the harness notch groove 10, the two harness outlet ports 16a and 16b can be formed, and by withdrawing the single water stop cover 13 from the harness notch groove 10, the two harness outlet ports 16a and 16b can be opened at a time.

In the above first embodiment, the adjacent harness outlet ports 16a and 16b are disposed respectively at the positions which are different in height, and are shifted relative to each other by an amount larger than the diameter D of wire harnesses WH1 and WH2 which are to be installed respectively in these ports 16a and 16b. Therefore, even when the water stop cover 13 is not yet mounted in the harness notch groove 10, the lower-side wire harness WH1 is prevented by a step-forming surface 30 (having a height larger than the height of this wire harness) from being moved toward the upper-side wire harness WH2. Thus, the lateral displacement of the wire harness WH1 can be prevented in a stable manner.

Figure 5:
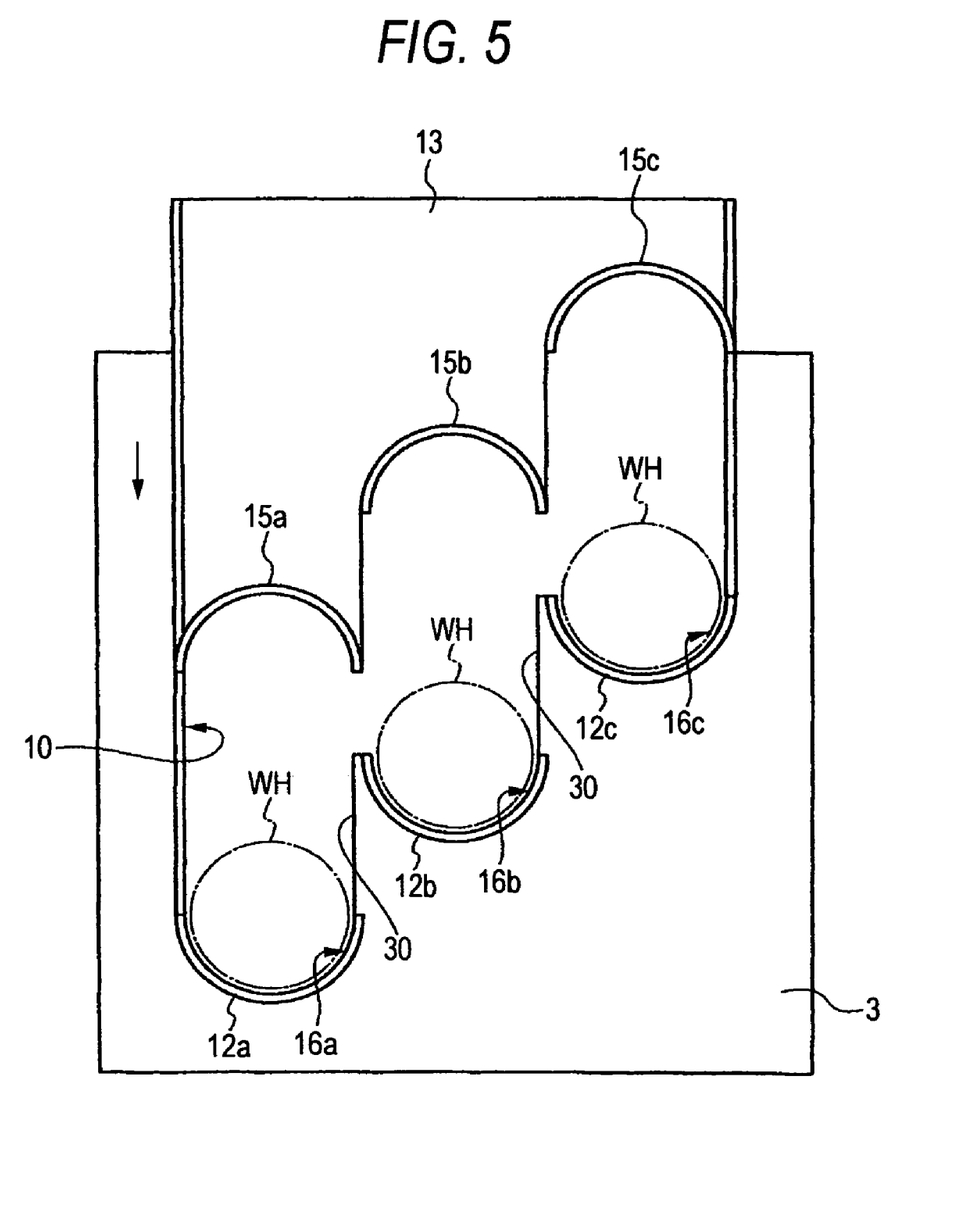
FIG. 5 is a front-elevational view showing the process of mounting a water stop cover, showing a second embodiment of the invention.

FIG. 5 shows a second embodiment of a wire harness leading-out structure of the invention. As shown in FIG. 5, three lower harness protective walls 12a, 12b and 12c of a semi-cylindrical shape are formed on and project from a lower end of a harness notch groove 10 in a case body 3. Three upper harness protective walls 15a, 15b and 15c of a semi-cylindrical shape are formed at a water stop cover 13. Three harness outlet ports 16a, 16b and 16c are formed by the three lower harness protective walls 12a, 12b and 12c and the three upper harness protective walls 15a, 15b and 15c. The three harness outlet portions 16a, 16b and 16c are so arranged that their heights sequentially vary in a stairs-like manner. Any two adjacent harness outlet ports (16a, 16b and 16c) are disposed respectively at positions which are different in height, and are shifted relative to each other by an amount larger than a diameter D of wire harnesses WH which are installed respectively in these ports 16a, 16b and 16c. A cross-sectional area of each of the harness outlet ports 16a, 16b and 16c is substantially equal to a cross-sectional area of the corresponding wire harness WH which is to be installed therein.

In this second embodiment, there are provided the three harness outlet ports 16a, 16b and 16c, and the lower one of any two adjacent wire harnesses WH is prevented by a step-forming surface 30 from being moved toward the higher one. Therefore, by bringing each lower wire harness WH in this direction, all of the three wire harnesses WH can be easily provisionally fixed. More than three harness outlet ports 16a, 16b and 16c can be so provided that their heights sequentially vary in a stairs-like manner, in which case also similar advantageous effects can be obtained.

Figure 6:
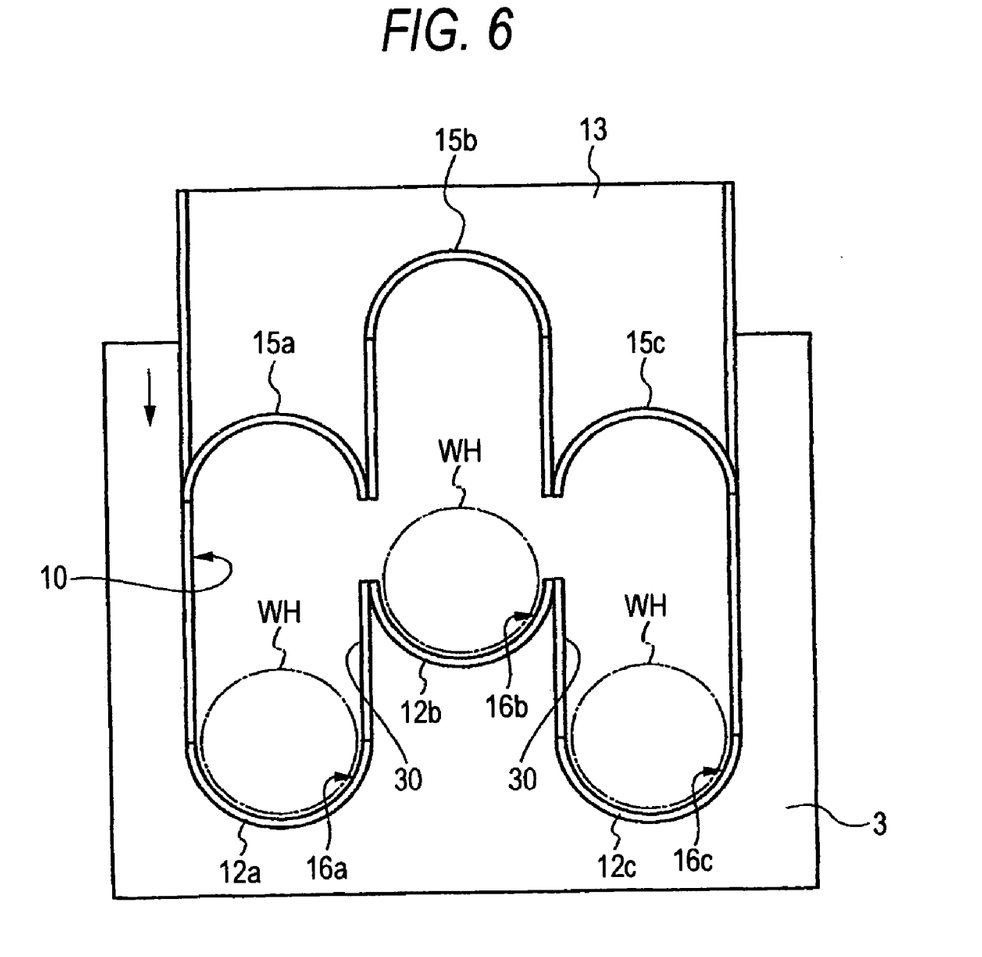
FIG. 6 is a front-elevational view showing the process of mounting a water stop cover, showing a third embodiment of the invention.

FIG. 6 shows a third embodiment of a wire harness leading-out structure of the invention. The third embodiment differs from the second embodiment in that left and right harness outlet ports 16a and 16c have the same height, while a central harness outlet port 16b is disposed at a level higher than the two outlet ports 16a and 16c. The other construction of this third embodiment is similar to that of the second embodiment, and therefore explanation thereof is omitted here, using identical reference numerals in the drawings.

In this third embodiment, there are provided the three harness outlet ports 16a, 16b and 16c, and a space of installation of the harness outlet ports 16a, 16b and 16c in the direction of the height can be made small. And besides, the left and right wire harnesses WH are prevented by step-forming surfaces 30 from being moved toward the central wire harness WH, and therefore there is achieved an advantage that the left and right wire harnesses WH can be easily provisionally fixed. More than three harness outlet ports 16a, 16b and 16c can be provided alternately at lower positions and higher positions, that is, in a staggered manner, in which case also similar advantageous effects can be obtained.

What is claimed is:

1. A wire harness leading-out structure comprising:
    a case in which a notch groove is formed; and
    a water stop cover slidably mounted to the notch groove,
    wherein a plurality of harness outlet ports are formed in a part of said notch groove which is not covered with said water stop cover, and
    adjacent harness outlet ports have different heights to each other so as to form a step portion therebetween.

2. The wire harness leading-out structure according to claim 1, wherein said adjacent harness outlet ports are arranged so as to form a height gap larger than a diameter of a wire harness to be lead out.

3. The wire harness leading-out structure according to claim 1, wherein said plurality of harness outlet ports are so arranged that heights vary sequentially.

4. The wire harness leading-out structure according to claim 1, wherein said plurality of harness outlet ports are arranged at two different heights.

5. The wire harness leading-out structure according to claim 1, wherein each of said plurality of harness outlet ports is provided with an upper harness protective wall of a semi-cylindrical shape projecting from a part of said water stop cover.

6. The wire harness leading-out structure according to claim 1, wherein each of said plurality of harness outlet ports is provided with a lower harness protective wall of a semi-cylindrical shape projecting from a part of said case.

7. An electric connection box mounted in a vehicle, comprising:
   a case in which a notch groove is formed; and
   a water stop cover slidably mounted to said notch groove,
      wherein a plurality of harness outlet ports are formed in a part of said notch groove which is not covered with said water stop cover, and
   adjacent harness outlet ports have different heights to each other so as to form a step portion therebetween.

8. The electric connection box according to claim 7, wherein said adjacent harness outlet ports are arranged so as to form a height gap larger than a diameter of a wire harness to be lead out.

9. The An electric connection box according to claim 7, wherein said plurality of harness outlet ports are so arranged that heights vary sequentially.

10. The electric connection box according to claim 7, wherein said plurality of harness outlet ports are arranged at two different heights.

11. The electric connection box according to claim 7, wherein each of said plurality of harness outlet ports is provided with an upper harness protective wall of a semi-cylindrical shape projecting from a part of said water stop cover.

12. The electric connection box according to claim 7, wherein each of said plurality of harness outlet ports is provided with a lower harness protective wall of a semi-cylindrical shape projecting from a part of said case.

* * * * *